(12) United States Patent
Yamashita

(10) Patent No.: US 8,582,970 B2
(45) Date of Patent: Nov. 12, 2013

(54) OFFICE-SIDE LINE CONCENTRATION DEVICE, ACCESS CONTROL DEVICE, AND COMPUTER PROGRAM THEREFOR

(75) Inventor: Kazuhisa Yamashita, Osaka (JP)

(73) Assignee: Sumitomo Electric Industries, Ltd, Osaka (JP)

( * ) Notice: Subject to any disclaimer, the term of this patent is extended or adjusted under 35 U.S.C. 154(b) by 416 days.

(21) Appl. No.: 12/746,706

(22) PCT Filed: Nov. 18, 2008

(86) PCT No.: PCT/JP2008/070915
§ 371 (c)(1),
(2), (4) Date: Jun. 7, 2010

(87) PCT Pub. No.: WO2009/075167
PCT Pub. Date: Jun. 18, 2009

(65) Prior Publication Data
US 2010/0266280 A1   Oct. 21, 2010

(30) Foreign Application Priority Data
Dec. 13, 2007   (JP) ................................ 2007-322212

(51) Int. Cl.
*H04B 10/00* (2013.01)
(52) U.S. Cl.
USPC ............................................. 398/72; 398/70
(58) Field of Classification Search
USPC ..................................................... 398/66–72
See application file for complete search history.

(56) References Cited

U.S. PATENT DOCUMENTS

| | | | | |
|---|---|---|---|---|
| 6,888,846 | B2 * | 5/2005 | Shraga et al. | 370/466 |
| 7,477,845 | B2 * | 1/2009 | Kramer | 398/71 |
| 7,590,139 | B2 * | 9/2009 | Boyd et al. | 370/442 |
| 7,889,990 | B2 * | 2/2011 | Kazawa et al. | 398/72 |
| 2002/0109876 | A1 * | 8/2002 | Eijk et al. | 359/110 |
| 2003/0137975 | A1 * | 7/2003 | Song et al. | 370/353 |
| 2005/0041682 | A1 * | 2/2005 | Kramer | 370/458 |
| 2006/0013260 | A1 * | 1/2006 | Oron | 370/498 |
| 2007/0154217 | A1 * | 7/2007 | Kim et al. | 398/72 |
| 2008/0219157 | A1 * | 9/2008 | Lakshminaraya et al. | 370/229 |

(Continued)

FOREIGN PATENT DOCUMENTS

| | | |
|---|---|---|
| CN | 1813432 A | 8/2006 |
| JP | 2004-253881 | 9/2004 |
| WO | WO 2005/020481 A1 | 3/2005 |
| WO | WO 2009119491 A1 * | 10/2009 |

OTHER PUBLICATIONS

Japanese Notification of Reasons for Rejection, w/ English translation thereof, issued in Japanese Patent Application No. 2007-322212, dated Jan. 10, 2012.

(Continued)

*Primary Examiner* — Agustin Bello
(74) *Attorney, Agent, or Firm* — McDermott Will & Emery LLP

(57) ABSTRACT

There is provided an office-side line concentration device that accommodates a plurality of passive optical networks, including a plurality of receiving means connected to each of the plurality of passive optical networks, and interface means for controlling a transmission timing of user data from the plurality of passive optical networks so that user data received by the plurality of receiving means can be arranged closely in an uplink, thus enabling effective use of bandwidth in the uplink.

3 Claims, 19 Drawing Sheets

(56) References Cited

U.S. PATENT DOCUMENTS

| | | | |
|---|---|---|---|
| 2008/0279554 A1* | 11/2008 | Kazawa et al. | 398/69 |
| 2009/0110403 A1* | 4/2009 | Kramer | 398/98 |
| 2010/0067910 A1* | 3/2010 | Mizutani et al. | 398/67 |
| 2010/0266280 A1* | 10/2010 | Yamashita | 398/58 |
| 2011/0026926 A1* | 2/2011 | Yamashita | 398/79 |

OTHER PUBLICATIONS

Chinese Office Action, w/ English translation thereof, issued in Chinese Patent Application No. 200880120219.8, dated Feb. 22, 2012.
IEEE Standard for Information technology—Telecommunications and information exchange between systems—Local and metropolitan area networks—Specific requirements, IEEE Standards 802.3ah™—2004, New York, NY USA.

* cited by examiner

OFFICE-SIDE LINE CONCENTRATION DEVICE, ACCESS CONTROL DEVICE, AND COMPUTER PROGRAM THEREFOR

RELATED APPLICATIONS

This application is the U.S. National Phase under 35 U.S.C. §371 of International Application No. PCT/JP2008/070915, filed on Nov. 18, 2008, which in turn claims the benefit of Japanese Application No. 2007-322212, filed on Dec. 13, 2007, the disclosures of which Applications are incorporated by reference herein.

TECHNICAL FIELD

The present invention relates to a PON (Passive Optical Network) that provides shared-medium communication in which a plurality of home-side devices share a medium to transmit data, and more specifically to an office-side line concentration device that accommodates a plurality of EPONs (Ethernet (registered trademark) PONs) for providing transmission of data in the form of Ethernet (registered trademark) frames and that multiplexes the data frames on an upper network (hereinafter referred to as an uplink), an access control device, and a computer program therefor.

BACKGROUND ART

Recently, the Internet has been widely spread, and users can access various information in websites around the world to obtain the information. In accordance therewith, devices capable of broadband access such as ADSL (Asymmetric Digital Subscriber Line) and FTTH (Fiber To The Home) have also become rapidly widespread.

Related art techniques relating thereto include techniques disclosed in Patent Document 1 and Non-Patent Document 1 below. In an office-side line concentration device disclosed in Patent Document 1, a buffer memory, a receiving unit, a transmitting unit, and a PON IF (interface unit) are provided for each of a plurality of PON transmission lines A, B, . . . , and Z. A control unit generates control frames so that normal frames received via the PON transmission lines A, B, . . . , and Z do not conflict, and sends the control frames to the PON transmission lines A, B, . . . , and Z.

Further, Non-Patent Document 1 specifies EPON access control protocols (MPCP (Multi-Point Control Protocol)) and OAM (Operations, Administration and Maintenance) protocols, and describes a method for registering a new home-side device using MPCP messages, bandwidth allocation requests, transmission instructions, and the like.
Patent Document 1: Japanese Unexamined Patent Application Publication No. 2004-253881
Non-Patent Document 1: IEEE Std 802.3ah (registered trademark)-2004

DISCLOSURE OF INVENTION

Problems to be Solved by the Invention

FIG. 21 is a diagram illustrating an example of an access control method in the office-side line concentration device disclosed in Patent Document 1. In FIG. 21, a case where user data frames from PON lines 1 and 2 are multiplexed and sent to an uplink is illustrated. A laser-off period in the PON line 1 and a laser-on period in the PON line 2 are made to overlap to effectively use bandwidth.

In the uplink, however, an amount of unused bandwidth equivalent to the laser-on period, synchronization period, and management-use frame sending period in the PON line 2 occurs between the user data frame from the PON line 1 and the user data frame from the PON line 2, and the bandwidth may not necessarily be sufficiently effectively used.

Furthermore, for example, when the transfer rate of the PON line 1 and the transfer rate of the PON line 2 are different, a larger amount of unused bandwidth in the uplink may be produced.

The present invention has been made in order to solve the above problem, and an object thereof is to provide an office-side line concentration device, an access control device, and a computer program therefor which enable effective use of bandwidth in an uplink.

Means for Solving the Problems

According to an aspect of the present invention, there is provided an office-side line concentration device that accommodates a plurality of passive optical networks, including a plurality of receiving means connected to each of the plurality of passive optical networks, and interface means for controlling a transmission timing of user data from the plurality of passive optical networks so that user data received by the plurality of receiving means can be arranged closely in an uplink.

The interface means controls a transmission timing of user data from a plurality of passive optical networks so that user data received by the plurality of receiving means can be arranged closely in an uplink, thus enabling effective use of bandwidth in the uplink.

Preferably, the interface means controls the transmission timing so that a difference between a reception timing of the user data received by the receiving means and a transmission timing to the uplink can be reduced.

The interface means controls the transmission timing so that a difference between a reception timing of the user data received by the receiving means and a transmission timing to the uplink can be reduced, thus enabling more effective use of bandwidth in the uplink.

Further preferably, all upstream transfer rates of user data in the passive optical networks are identical to an upstream transfer rate of the uplink, and the interface means transmits the user data received by the plurality of receiving means directly to the uplink without accumulating the user data in a buffer.

The interface means transmits the user data received by the plurality of receiving means directly to the uplink without accumulating the user data in a buffer, thus requiring no buffers and enabling a reduction in the cost of the apparatus.

Further preferably, the interface means controls the reception timing so that a burst signal of a first passive optical network and a burst signal of a second passive optical network are made to overlap and so that an overlapped time can become at least a portion of a time obtained by removing a time corresponding to a user data frame period and a laser-off period from a burst length of the second passive optical network.

The interface means controls the reception timing so that a burst signal of a first passive optical network and a burst signal of a second passive optical network are made to overlap and so that an overlapped time can become at least a portion of a time obtained by removing a time corresponding to a user data frame period and a laser-off period from a burst length of the second passive optical network, thus enabling successive transmission of user data frames in the uplink.

Further preferably, the plurality of passive optical networks include a passive optical network including a home-side device having a lower upstream transfer rate than an upstream transfer rate of the uplink, and the interface means controls the reception timing so that, when user data from the home-side device having a lower upstream transfer rate than that of the uplink is up-converted and transmitted to the uplink, the end of the user data from the home-side device having a lower upstream transfer rate can exist before the end of the user data up-converted and transmitted to the uplink.

The plurality of passive optical networks include a passive optical network including a home-side device having a lower upstream transfer rate than an upstream transfer rate of the uplink, and the interface means controls the reception timing so that, when user data from the home-side device having a lower upstream transfer rate than that of the uplink is up-converted and transmitted to the uplink, the end of the user data from the home-side device having a lower upstream transfer rate can exist before the end of the user data up-converted and transmitted to the uplink, thus enabling more effective use of bandwidth of the uplink.

Further preferably, the interface means controls the reception timing so that a burst signal of a first passive optical network and a burst signal of a second passive optical network are made to overlap and so that an overlapped time can become at least a portion of a time obtained by removing a time required to transmit a user data frame at an uplink speed and a time corresponding to a laser-off period from a burst length of the second passive optical network.

The interface means controls the reception timing so that a burst signal of a first passive optical network and a burst signal of a second passive optical network are made to overlap and so that an overlapped time can become at least a portion of a time obtained by removing a time required to transmit a user data frame at an uplink speed and a time corresponding to a laser-off period from a burst length of the second passive optical network, thus enabling successive transmission of user data frames in the uplink.

According to another aspect of the present invention, there is provided an access control device that controls a reception timing of user data from a plurality of passive optical networks, including means for controlling a transmission timing of user data from the plurality of passive optical networks so that user data received by the plurality of passive optical networks can be arranged closely in an uplink, and means for instructing transmission of a grant including the transmission timing to home-side devices connected to the passive optical networks.

According to still another aspect of the present invention, there is provided a computer program for causing a computer to execute control of a reception timing of user data from a plurality of passive optical networks, causing the computer to execute a step of controlling a transmission timing of user data from the plurality of passive optical networks so that user data received by the plurality of passive optical networks can be arranged closely in an uplink, and a step of instructing transmission of a grant including the transmission timing to home-side devices connected to the passive optical networks.

Advantages

According to an aspect of the present invention, interface means controls a transmission timing of user data from a plurality of passive optical networks so that user data received by the plurality of receiving means can be arranged closely in an uplink, thus enabling effective use of bandwidth in the uplink.

Figure 1:
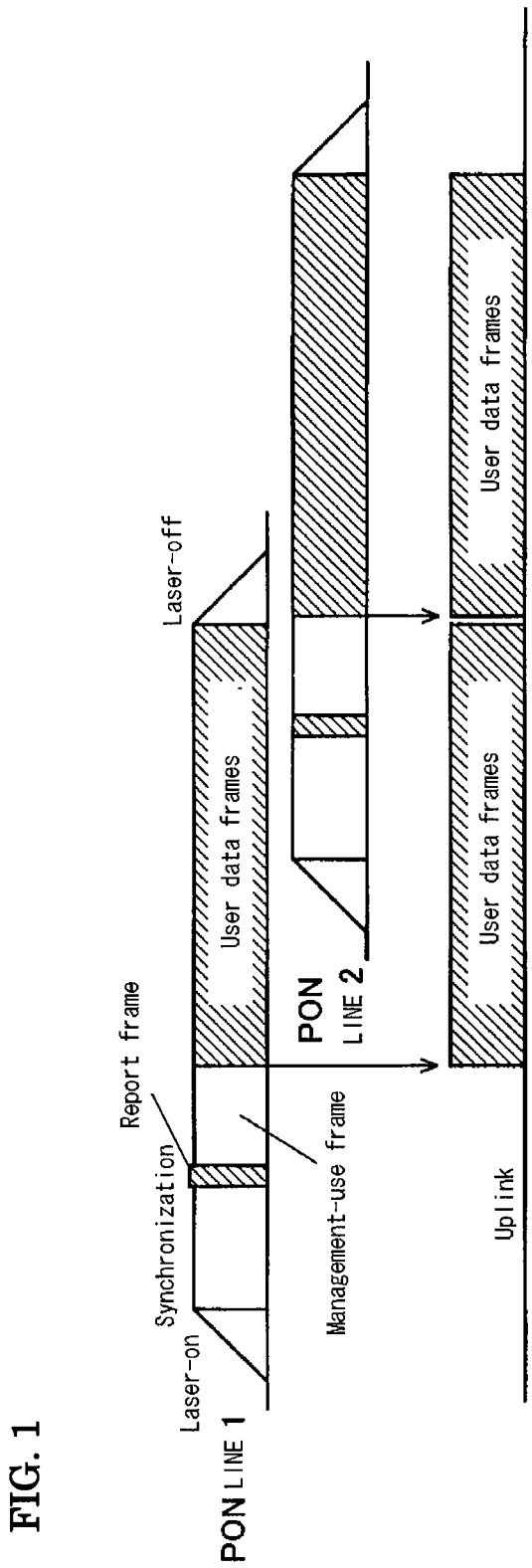
FIG. 1 is a diagram for describing an example of an access control method in an office-side line concentration device according to a first embodiment of the present invention.

REFERENCE NUMERALS 1 uplink IF unit,
2 PON IF unit,
11 access control unit,
12 uplink transmitting/receiving unit,
13 DEMUX,
14 line concentration unit,
21 PON communication unit,
22 PON transmitting/receiving unit,
31 4-to-1 MUX,
41 input unit, 42, 62, 71, 72 FIFO,
43 MUX control unit,
44 multiplexer,
45 output unit,
51 CPU,
52 ROM,
53 RAM,
54 shared memory,
55 input/output unit,
56 clock timer,
61 input unit,
63 transmission processing unit,
64 reception processing unit,
65 management frame processing unit,
66 MPCP frame processing unit,
68 output unit,
100 office-side line concentration device, and
101 home-side device.

BEST MODES FOR CARRYING OUT THE INVENTION

Embodiments of the present invention will be described hereinafter with reference to the drawings. In the following figures, the same or corresponding portions will not be described redundantly.

(First Embodiment)

FIG. 1 is a diagram for describing an example of an access control method in an office-side line concentration device according to a first embodiment of the present invention. In the present embodiment, access control is performed so that a user data frame sending period of a PON line 1 is made to overlap a laser-on period, synchronization period, report frame sending period, and management-use frame sending period of a PON line 2. Thus, user data frames from the PON line 1 and user data frames from the PON line 2 are successively sent to an uplink. The term successively (or closely), as used herein, refers to an interval at which user data frames are sent to the uplink, which is greater than or equal to a minimum IFG (Inter Frame Gap) and less than a maximum overhead time. The maximum overhead time is a time corresponding to the laser-on period, the synchronization period, and the report frame and management-use frame sending periods.

In FIG. 1, a report frame, a management-use frame, and user frames are transmitted in this order from a home-side device after the synchronization period. However, the order of the frames is arbitrary. Access control may be performed so that an overlap of a time obtained by subtracting the time corresponding to the user data frames period including the IFG and the preamble and the laser-off period from the burst length (time) of the PON line 2 can be used. In this case, user data frames may overlap between consecutive bursts. However, the collision of the user data frames can be avoided because they are placed in the uplink after being subjected to delay adjustment using FIFOs (First In First Outs) described below. Further, the overlap time may be set to that in the above example at maximum or may be set to a less value.

Figure 2:
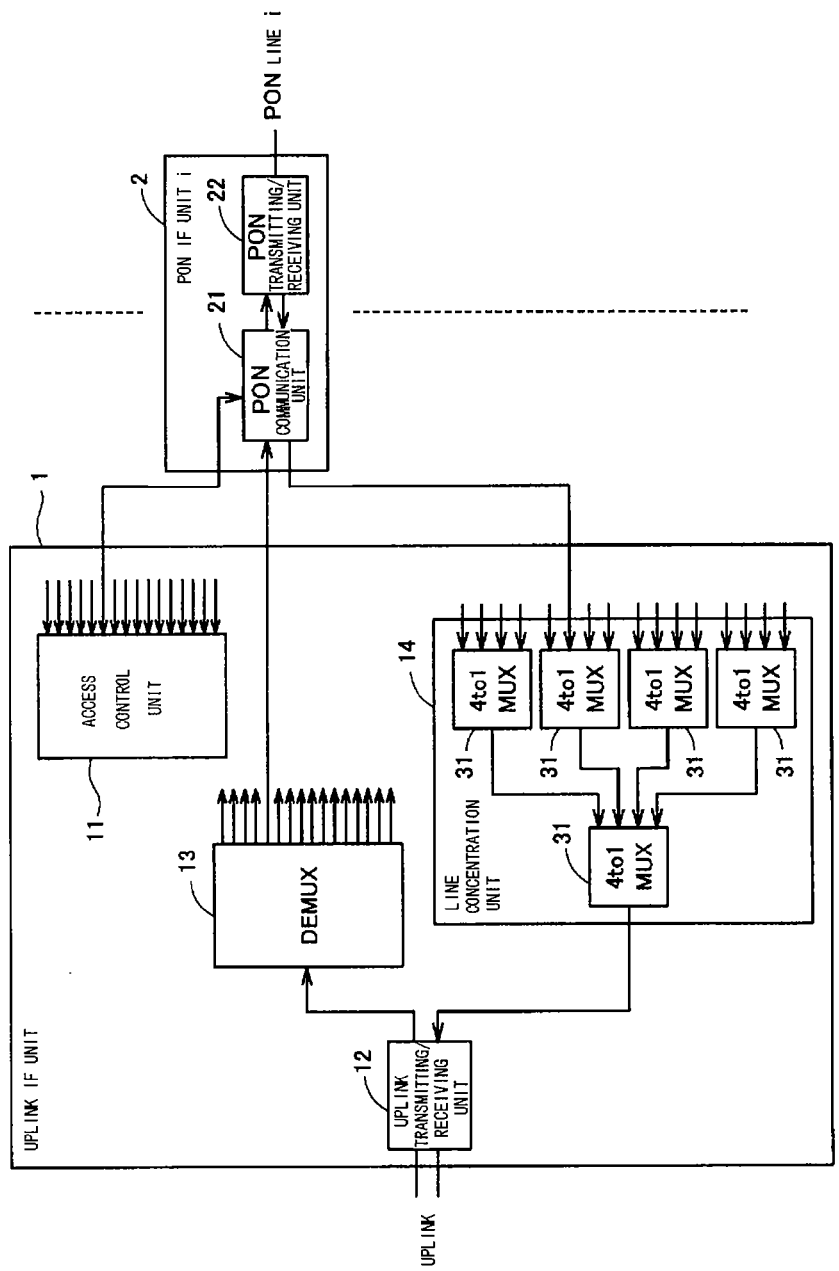
FIG. 2 is a block diagram illustrating an example configuration of the office-side line concentration device according to the first embodiment of the present invention.

FIG. 2 is a block diagram illustrating an example configuration of an office-side line concentration device according to the first embodiment of the present invention. This office-side line concentration device includes an uplink IF (Interface) unit 1 and N PON IF units 2. In the configuration illustrated in FIG. 2, N=16, and 16 PON lines i (i=1 to 16) are concentrated. However, the number of PON lines is not limited to this.

The PON lines may not necessarily be passive. In general, splitting is performed using optical couplers but may be performed using active optical switches instead. Here, a PON line mean a line that accommodates a plurality of home-side devices using MPCP.

A description will be given of a case where an uplink is implemented using a 10 GE (10 gigabit Ethernet (registered trademark)) uplink and where a PON line is implemented using a 10G-EPON (10 gigabit Ethernet (registered trademark) PON) line. However, an uplink may be implemented using a GE (gigabit Ethernet (registered trademark)) uplink and a PON line may be implemented using a GE-PON (gigabit Ethernet (registered trademark) PON) line.

The uplink IF unit 1 includes an access control unit 11 that performs upstream access control for an uplink and each of the PON lines, an uplink transmitting/receiving unit 12 that transmits and receives frames to and from the uplink, a DEMUX 13 that outputs a downstream signal received by the uplink transmitting/receiving unit 12 to the individual PON IF units 2, and a line concentration unit 14 that multiplexes upstream signals from the individual PON IF units 2 and that outputs a resulting signal to the uplink transmitting/receiving unit 12.

Further, each of the PON IF units 2 includes a PON transmitting/receiving unit 22 that transmits and receives signals to and from the corresponding one of the PON lines, and a PON communication unit 21 that terminates data links to home-side devices connected to the PON line and that relays main signals directed to the uplink.

The DEMUX 13 outputs a downstream signal received by the uplink transmitting/receiving unit 12 to the individual PON IF units 2. The DEMUX 13 may send a downstream signal delivered from the uplink transmitting/receiving unit 12 directly to the individual PON IF units 2, or may analyze the content of downstream frames to identify the transmission destinations of the frames and selectively send them to corresponding ones of the PON IF units 2. The identification may be performed using VLAN (Virtual Local Area Network) tags, or using MAC (Media Access Control) addresses.

The line concentration unit 14 is configured using a plurality of 4-to-1 MUXes 31 each of which multiplexes four lines, and the plurality of 4-to-1 MUXes 31 are multi-connected to implement a desired number of multiplexes N. In the present embodiment, five 4-to-1 MUXes 31 are multi-connected to implement a 16-to-1 MUX.

Figure 3:
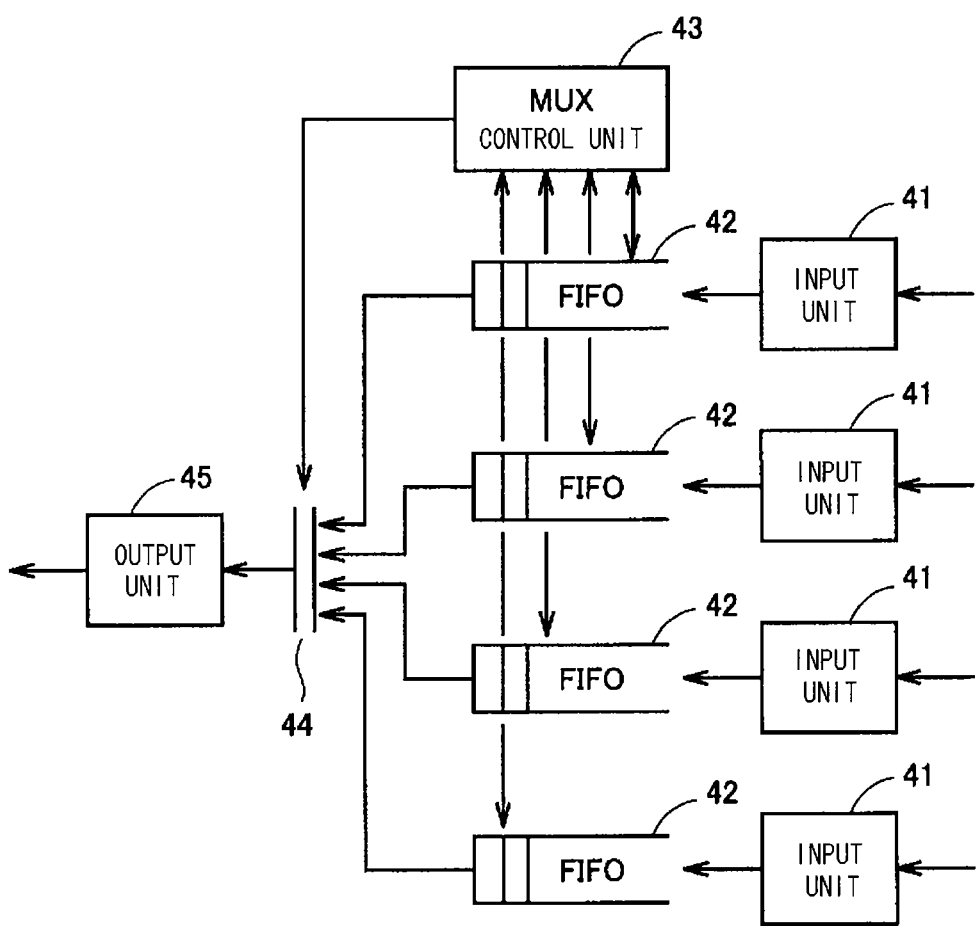
FIG. 3 is a block diagram illustrating an example configuration of a 4-to-1 MUX 31.

FIG. 3 is a block diagram illustrating an example configuration of a 4-to-1 MUX 31. The 4-to-1 MUX 31 includes four input units 41 each of which is connected to the corresponding one of the PON IF units 2, four FIFOs (First In First Outs) 42 individually connected to the input units 41, a MUX control unit 43 that receives a notification of the amount of accumulated frames from each of the FIFOs 42 and that controls the output of frames accumulated in the FIFOs 42, a multiplexer 44, and an output unit 45 that outputs frames from the multiplexer 44 to the subsequent 4-to-1 MUX 31 or the uplink transmitting/receiving unit 12.

The input units 41 convert high-speed serial signals from the PON IF units 2 into low-speed parallel internal signals which are accumulated in the FIFOs 42. The internal signals can be 64-bit 156.25-Mbps signals. The FIFOs 42 notify the MUX control unit 43 of the accumulation state of frames.

The MUX control unit 43, which monitors the status of the FIFOs 42, exclusively extracts frames from the FIFOs 42 in which the frames are accumulated, and outputs the frames to the output unit 45 while controlling the multiplexer 44.

The output unit 45 converts the frames received from the multiplexer 44 into high-speed serial signals, for example, XAUI (10 Gbps Attachment Unit Interface) signals, and outputs the resulting signals.

As described below, the access control unit 11 performs access control so that upstream signals in PON lines can be output directly to the uplink, and therefore the capacity of FIFOs may be small. That is, these FIFOs are designed to avoid temporary collision due to the deviation dependent upon accuracy, the difference in arrangement of user data frames in a burst, or the like or to absorb slight shift between the input and output clock frequencies. If the access control unit 11 provides sufficient allocation intervals between the PON lines, each of the 4-to-1 MUXes 31 can be configured such that the FIFOs 42 and the MUX control unit 43 are removed so that frames can be forwarded directly from the input units 41 to the multiplexer 44. In this case, the multiplexer 44 may be controlled by the input units 41 or may be designed to simply perform an OR operation (to output a logic 0 signal during a period during which no data is output).

The PON communication units 21 are connected to the access control unit 11 via control lines. MPCP frames are transmitted and received by the PON communication units 21 while MPCP messages pass through the PON communication units 21 and terminate at the access control unit 11. In this case, the PON communication units 21 may add a timestamp at the time of PON reception or overwrite a timestamp at the time of PON transmission. This prevents a dependence of the RTT (Round Trip Time) or timestamp drift upon an internal processing delay of the access control unit 11, and increases accuracy. It is assumed that the access control unit 11 and each of the PON communication units 21 have a common clock.

Figure 4:
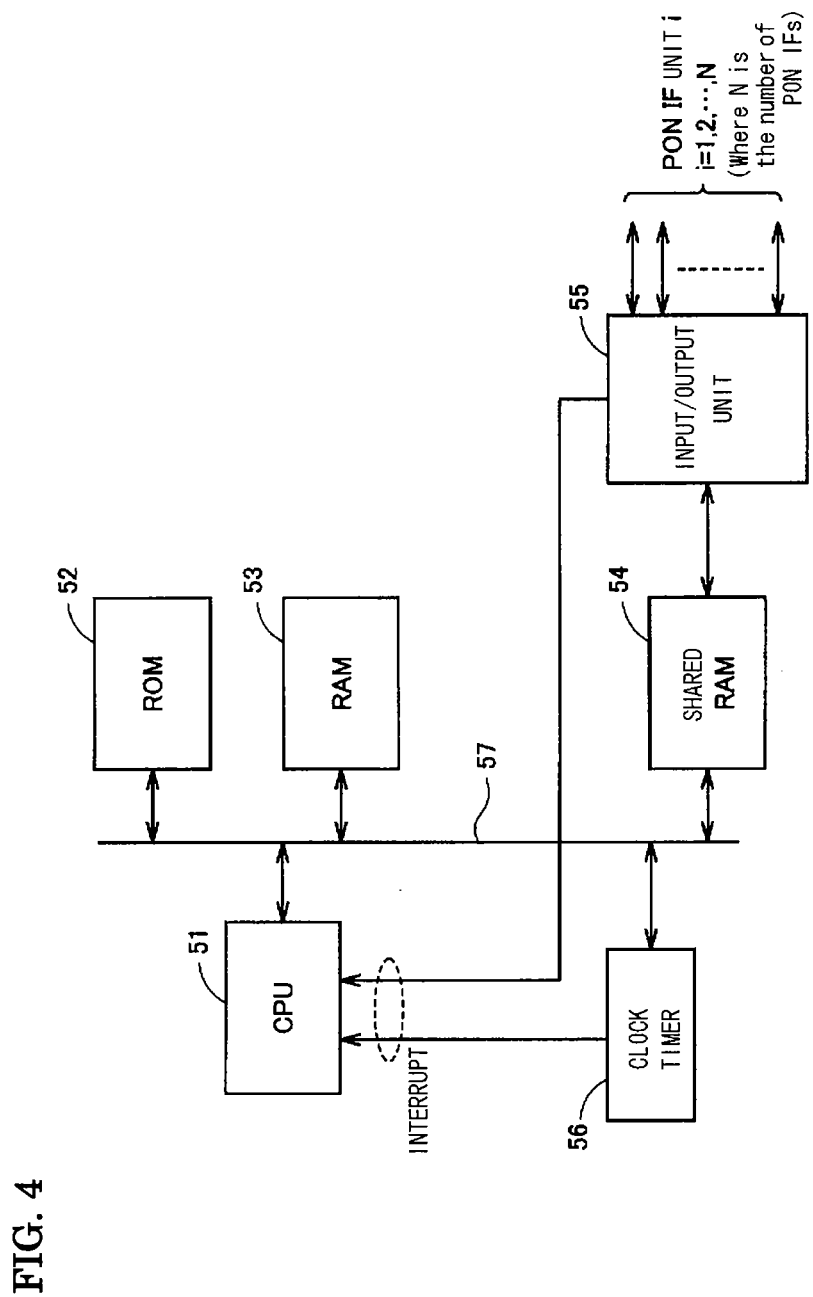
FIG. 4 is a diagram illustrating an example configuration of an access control unit 11 when implemented in software.

FIG. 4 is a diagram illustrating an example configuration of the access control unit 11 when implemented in software. It is to be understood that the access control unit 11 may also be implemented by hardware.

The access control unit 11 includes a CPU (Central Processing Unit) 51, a ROM (Read Only Memory) 52, a RAM (Random Access Memory) 53, a shared memory 54, an input/output unit 55, and a clock timer 56.

The CPU 51 executes an access control program stored in the ROM 52, thereby implementing the functions of the access control unit 11. Further, the RAM 53 holds various information used for access control. The details of the various information will be described below.

The input/output unit 55 is connected to the PON IF units 2, and controls the input and output of messages. Upon receipt of message signals received by the PON IF units 2, the input/output unit 55 converts the message signals into the internal format, and adds the results to an input message queue (Qin) of the shared RAM 54. In this case, when the Qin is changed from an empty state to a non-empty state, the input/output unit 55 sends an interrupt to the CPU 51.

Further, in accordance with an instruction from the CPU 51, the input/output unit 55 outputs messages accumulated in an output message queue (Qeg) in the shared RAM 54 to the PON IF units 2.

The clock timer 56 has a clock function for measuring the current time (ctime), and a counter function for counting predetermined times. The value of the ctime of the clock timer 56 is referred to by the CPU 51.

In a case where the clock timer 56 functions as a discovery timer (TD) and a logical link timer (TLij: i=1, 2, ..., N: j∈{the LLIDs (Logical Link IDs) of the PON IFs i}) described below, when a count value reaches a value set by the CPU 51, the clock timer 56 sends an interrupt to the CPU 51 and notifies it of a count-out.

FIGS. 5 to 15 are flowcharts for describing a process procedure of the access control unit 11. The various information held in the RAM 53 will now be described.

A final allocation time (TEi: i=1, 2, ..., N) is based on an overlap of the laser-off period (Toff) and the laser-on period (Ton), and is a time obtained by subtracting the amount of Toff from the final time of the grant period. In FIG. 1, for example, the end time of the user data frame in the PON line 1 (laser-off start time) is a final allocation time. This final allocation time is held in the RAM 53 for each of the N PON IFs.

In a case where the grant period does not include a minimum IFG (interframe gap) after the last frame, the minimum IFG is added to the final allocation time. Note that no overlap may be assumed and that Toff may not be subtracted.

An overall final allocation time (TEz) is only one time held in the RAM 53, and is basically the final allocation time of the last allocated PON IF k. However, there may also be an exception. This exception will be described later.

A discovery order list (dLST) is designed such that the order of PON IFs to be subjected to a discovery process is held in list form, and is set to, for example, 1→2→...→N→1 or the like.

Logical link information (LLTij: i=1, 2, ..., N: j∈{the LLIDs of the PON IFs i}) is information held in the RAM 53 in table form for each logical link, and includes a logical link status (LLstat), a report status (RPstat), a management-frame-use report information (RPm), user-data-use report information (RPu), and RTT (Round Trip Time) information. The report information may reflect the latest report for simplicity, or may be in queue form.

The logical link status (LLstat) is information indicating the status of a logical link, and has the following states: unregistered, registration-in-progress, and registered.

The report status (RPstat) is information indicating whether the report of the logical link is valid or invalid.

The management-use frame report information (RPm) is information indicating the time required to send reported management-use frames.

The user-data-use report information (RPu) is information indicating the time required to send reported user data frames.

The access control unit 11 is given the allocation order of the PON IFs and the allocation order of the logical links in the PON IFs. The allocation order may be determined using a simple round robin method or any other method such as a weighted round robin method, a hierarchical round robin method for differentiating allocation cycles, or skipping the allocation of logical links that are excessively allocated based on bandwidth calculation.

The allocation order is systematized in general scheduling techniques, and the present invention does not depend upon a specific scheduling technique. However, non-consecutive allocations to the same PON IF can provide improvement of the advantageous effects of the present invention.

Further, the present invention bears no relation to the timing of allocation. The allocation may be performed each time a report frame is received or may be performed after report frames have been intensively collected.

Figure 5:
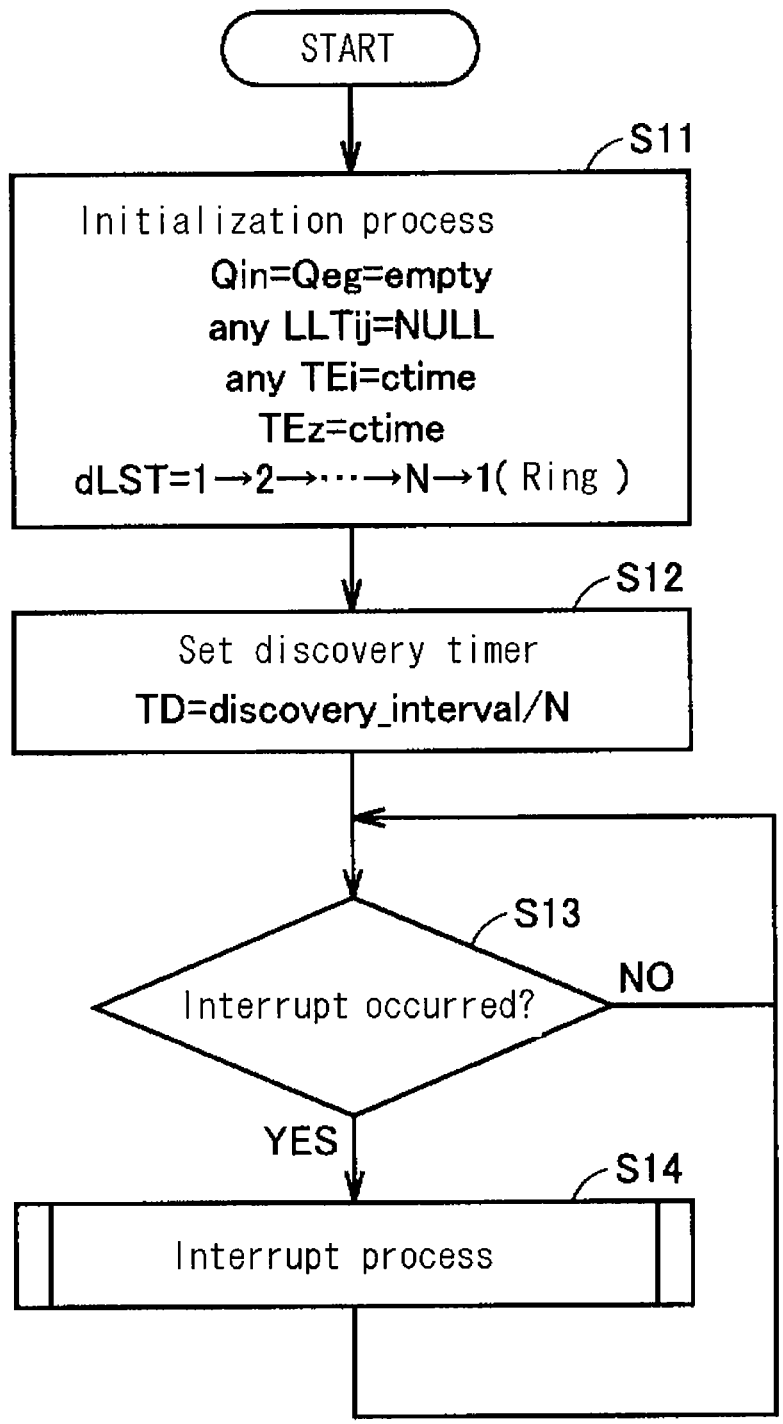
FIG. 5 is a flowchart for describing a procedure of an initialization process of the access control unit 11.

FIG. 5 is a flowchart for describing the procedure of the initialization process of the access control unit 11. First, the input message queue Qin and the output message queue Qeg are brought into an empty condition, all the pieces of logical link information LLTij (i=1, 2, ..., N: j∈{the LLIDs of the PON IFs i}) are set to NULL, and all the final allocation times TEi are set to the current time ctime, the overall final allocation time TEz is set to ctime, and the discovery order list dLST is set to 1→2→...→N→1 (S11).

Next, the discovery timer TD is set to the value obtained by dividing a discovery cycle discovery_interval by N (S12). TD represents an interval at which the discovery process is performed in sequence on the N PON lines, and the discovery process is performed on the subsequent PON line each time TD has elapsed.

Next, the process waits for an interrupt to occur (S13). When an interrupt occurs (S13, Yes), the process proceeds to an interrupt process routine (S14).

Figure 6:
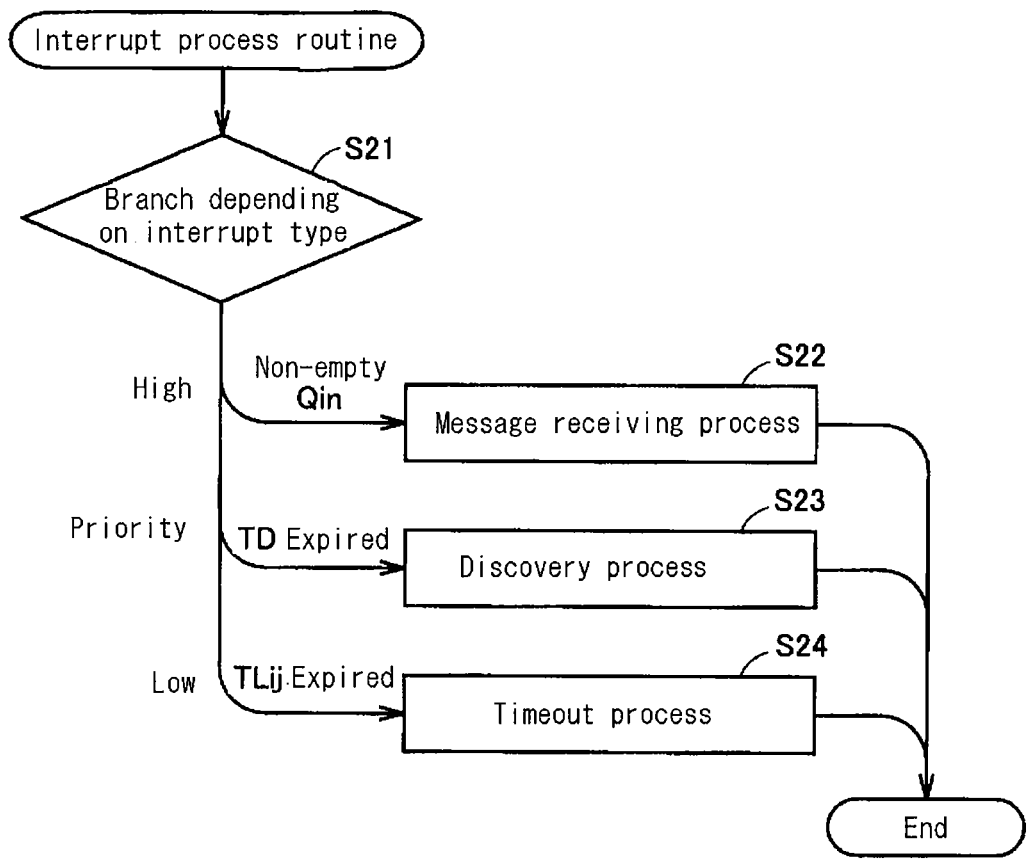
FIG. 6 is a flowchart for describing a procedure of an interrupt process routine.

FIG. 6 is a flowchart for describing the procedure of the interrupt process routine. First, the routine branches depending on the type of the interrupt (S21). When the interrupt indicates that the Qin is not empty (S21, non-empty Qin), the routine proceeds to a message receiving process (S22). When the interrupt indicates a count up of TD (S21, TD expired), the routine proceeds to a discovery process (S23). Further, when the interrupt indicates a count up of TLij (S21, TLij expired), the routine proceeds to a timeout process (S24).

It is assumed that an interrupt indicating that the Qin is not empty is assigned the highest priority and that interrupts are assigned lower priorities in decreasing order of TD expired and TLij expired.

Figure 7:
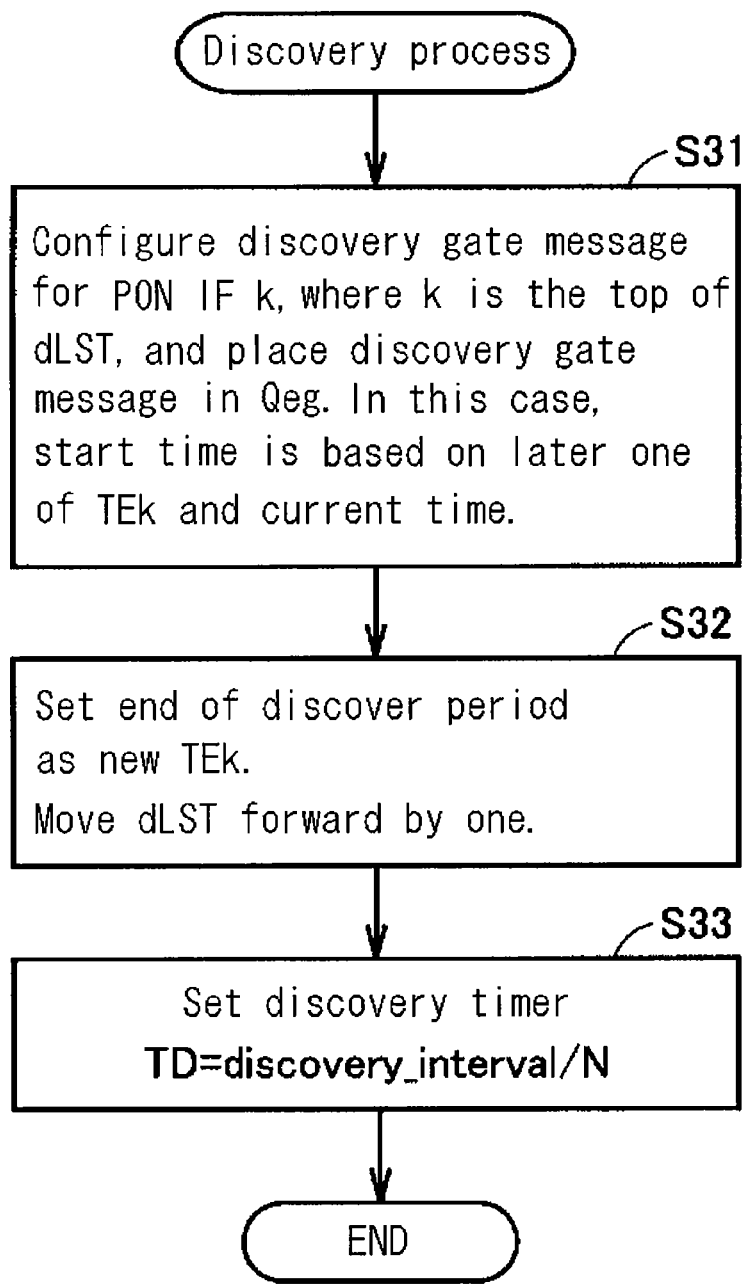
FIG. 7 is a flowchart for describing a procedure of a discovery process.

FIG. 7 is a flowchart for describing the procedure of the discovery process. First, assuming that the top of the dLST is represented by k, a discovery gate message for the PON IF k is configured and is placed in the Qeg. In this case, the start time is based on the later one of the TEk and the current time (S31).

Next, the end of the discovery period is set as the new TEk, and the dLST moves to the subsequent PON IF unit (S32). Then, the discovery timer TD is set (S33), and the process ends.

Figure 8:
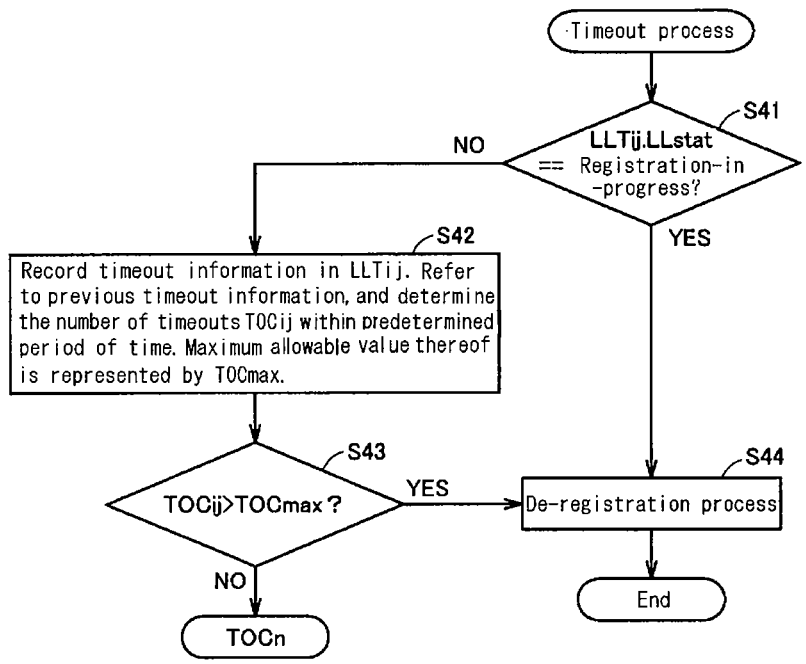
FIG. 8 is a flowchart for describing a procedure of a timeout process.

FIG. 8 is a flowchart for describing the procedure of the timeout process. First, it is determined whether or not the LLstat in the LLTij indicates registration-in-progress (S41). When it does not indicate registration-in-progress (S41, No), timeout information is recorded in the LLTij. Then, previous timeout information is referred to, and the number of timeouts TOCij within a predetermined period of time is determined. Here, the maximum allowable value is represented by TOCmax (S42).

Next, TOCij is compared with TOCmax. When TOCil is less than or equal to TOCmax (S43, No), the process proceeds to a TOCn process illustrated in FIG. 9. When TOCij is greater than TOCmax (S43, Yes), a de-registration process is performed (S44).

When, in step S41, the LLstat in the LLTij indicates registration-in-progress (S41, Yes), the de-registration process is performed (S44).

Figure 9:
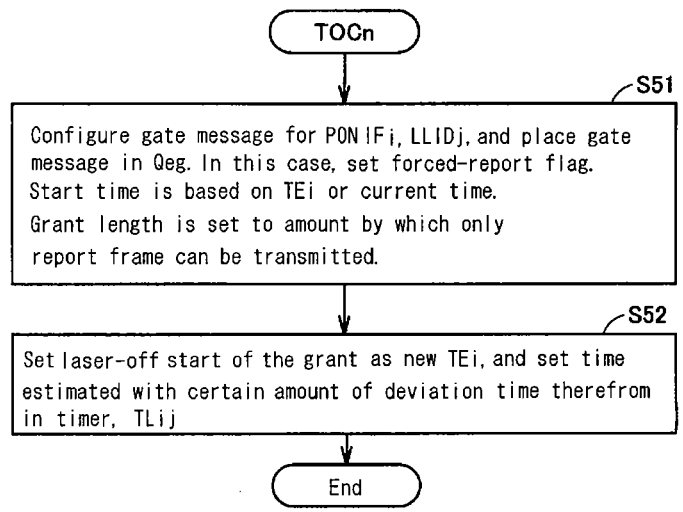
FIG. 9 is a flowchart for describing a procedure of a TOCn process.

FIG. 9 is a flowchart for describing the procedure of the TOCn process. First, a gate message for the LLIDj of the PON IF i is configured and is placed in the Qeg. In this case, a forced-report flag is set to make a forced-report instruction. Further, the start time is based on the TEi or the current time, and the grant length is set to an amount by which only the report frame can be transmitted (S51).

Then, the laser-off start of the grant is set as the new TEi, and a time estimated with a certain amount of deviation time therefrom is set in the timer TLij (S52). Then, the process ends.

Figure 10:
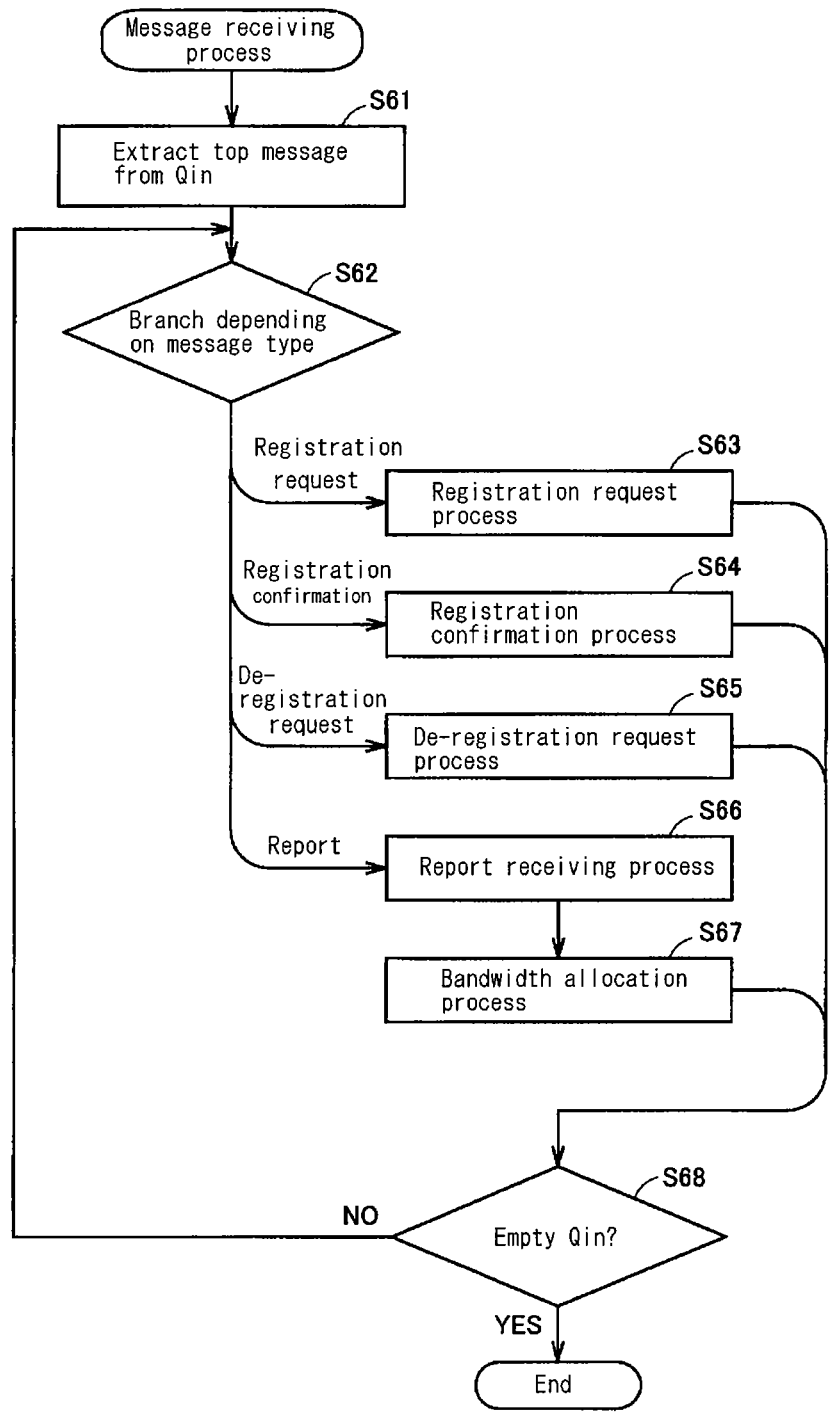
FIG. 10 is a flowchart for describing a procedure of a message receiving process.

FIG. 10 is a flowchart for describing the procedure of the message receiving process. A timestamp recorded on a message using a home-side device is represented by T1, and a timestamp added by the PON communication unit 21 when the message is received is represented by T2.

First, the top message is extracted from the Qin (S61). When the type of the message is registration request (S62, registration request), a registration request process is performed (S63). When the type of the message is registration confirmation (S62, registration confirmation), a registration confirmation process is performed (S64).

When the type of the message is de-registration request (S62, de-registration request), a de-registration process is performed (S65). When the type of the message is report (S62, report), a report receiving process is performed (S66), and a bandwidth allocation process is performed (S67).

When the processing of steps S63 to S65 or the processing of S67 is completed, it is determined whether or not the Qin is empty (S68). When the Qin is not empty (S68, No), the process returns to step S61, and the processing subsequent thereto is performed. When the Qin is empty (S68, Yes), the process ends.

Figure 11:
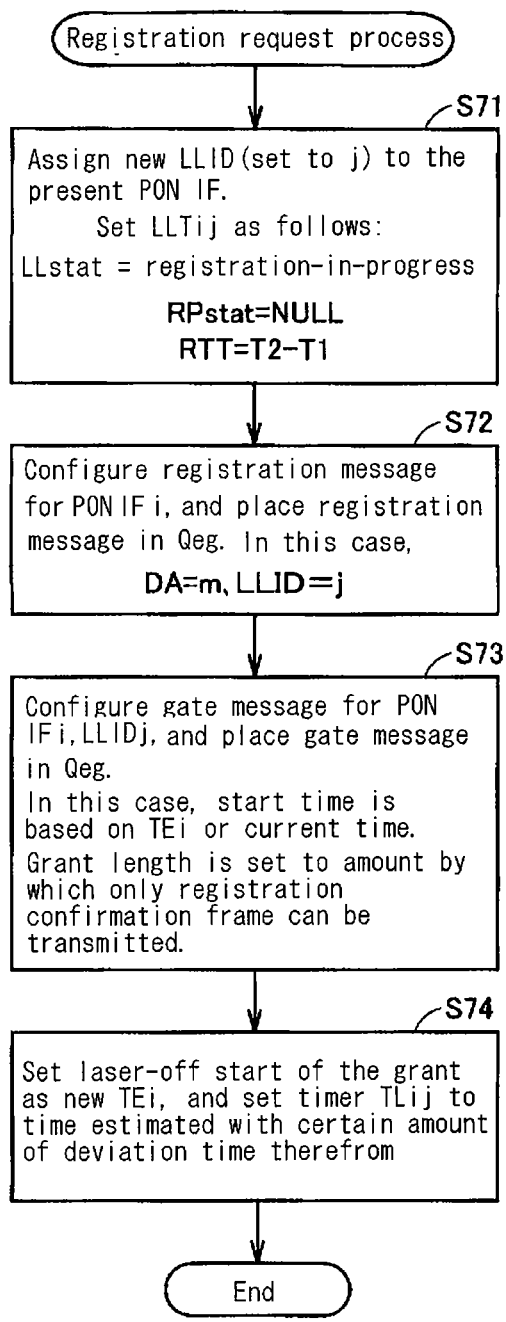
FIG. 11 is a flowchart for describing a procedure of a registration request process.

FIG. 11 is a flowchart for describing the procedure of the registration request process. It is assumed that this registration request is a request issued from a home-side device being connected to PON IF i, for which the MAC address is m.

First, a new LLID is assigned to the present PON IF from which the registration request has been issued, and is represented by LLIDj. Then, the LLstat in the LLTij is set to registration-in-progress, RPstat is set to NULL, and the RTT is set to (T2−T1) (S71).

Next, a registration message for the PON IF i is configured and is placed in the Qeg. In this case, the DA (Destination Address) is set to m, and the LLID is set to j (S72). Note that this LLID is written in the registration message and is reported to the home-side device and that the LLID written in the header portion of the frame is a broadcast LLID.

Next, a gate message for the PON IF i, LLIDj is configured and is placed in the Qeg. In this case, the start time is based on the TEi or the current time. Further, the grant length is set to an amount by which only the registration confirmation frame can be transmitted (S73).

Finally, the laser-off start of the grant is set as the new TEi, and a time estimated with a certain amount of deviation time therefrom is set in the timer TLij (S74). Then, the process ends.

Figure 12:
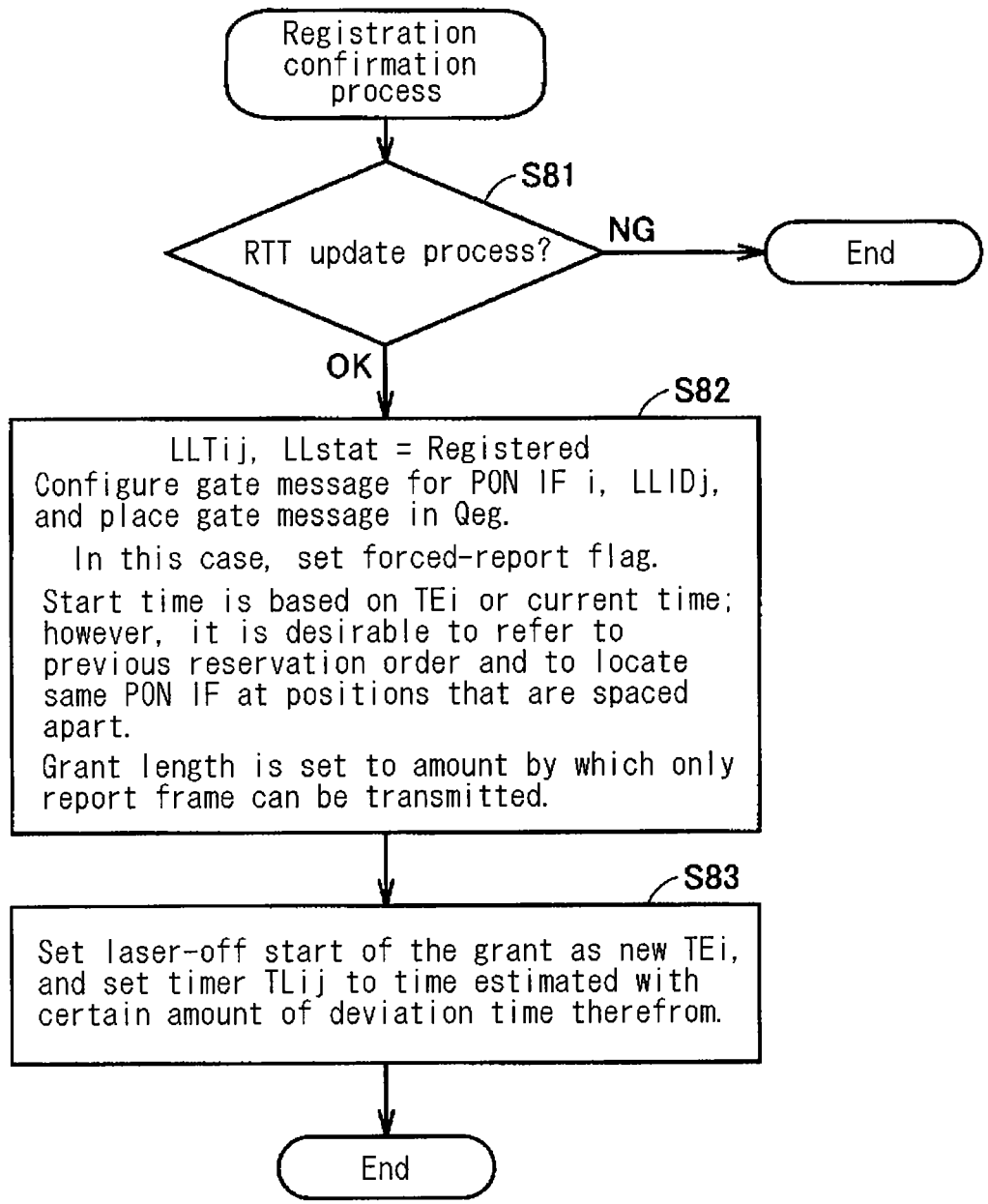
FIG. 12 is a flowchart for describing a procedure of a registration confirmation process.

FIG. 12 is a flowchart for describing the procedure of the registration confirmation process. First, RTT is recalculated, and the RTT update process of the corresponding logical link is performed. In this case, when the drift exceeds a specified value (S81, NG), the process ends.

When the drift is equal to or below the specified value (S81, OK), the LLstat in the LLTij is set to registered, and a gate message for the PON IF i, LLIDj is configured and is placed in the Qeg. In this case, a forced-report flag is set to make a forced-report instruction. Further, the start time is based on the TEi or the current time. Preferably, the previous reservation order is referred to and the same PON IF is placed at positions that are spaced apart. Then, the grant length is set to an amount by which only the report frame can be transmitted (S82).

Next, the laser-off start of the grant is set as the new TEi, and a time estimated with a certain amount of deviation time therefrom is set in the timer TLij (S83). Then, the process ends.

Figure 13:
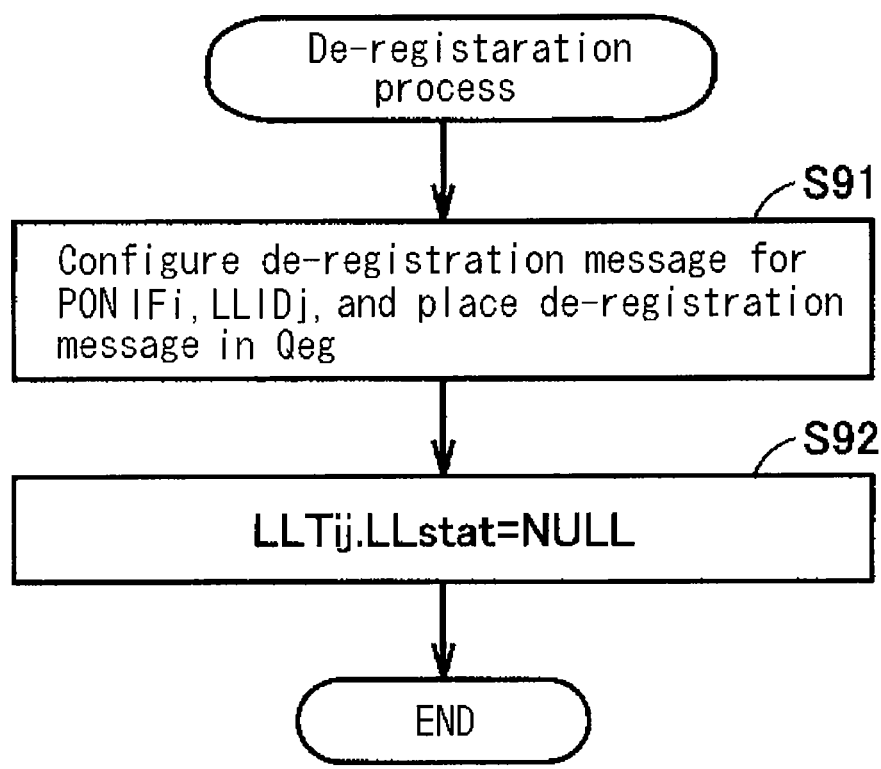
FIG. 13 is a flowchart for describing a procedure of a de-registration process.

FIG. 13 is a flowchart for describing the procedure of the de-registration process. It is assumed that the PON IF i, LLIDj is to be de-registered. First, a de-registration message for the PON IF i, LLIDj is configured and is placed in the Qeg (S91). Then, the LLstat in the LLTij is set to NULL (S92), and the process ends.

Figure 14:
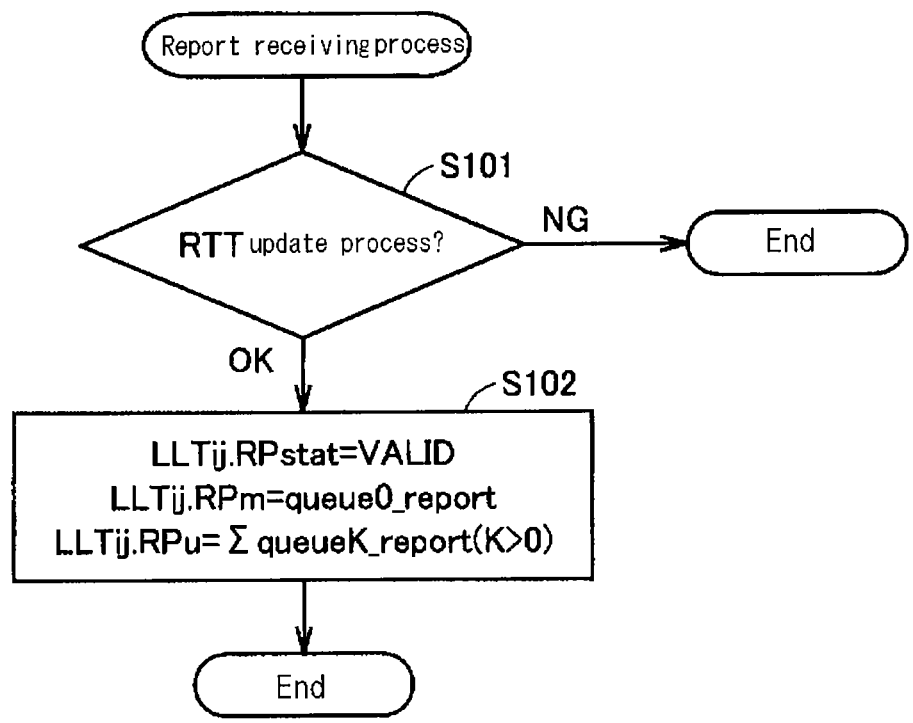
FIG. 14 is a flowchart for describing a procedure of a report receiving process.

FIG. 14 is a flowchart for describing the procedure of the report receiving process. It is assumed that a report from the PON IF i, LLIDj is to be received. First, RTT is recalculated, and the RTT update process of the corresponding logical link is performed. In this case, when the drift exceeds a specified value (S101, NG), the process ends.

When the drift is equal to or below the specified value (S101, OK), then the RPstat in the LLTij is set valid, the RPm is updated to a management-frame-use report queue queue0_report, and the RPu is updated to the sum of user-frame-use report queues queueK_report (S102). Then, the process ends.

Figure 15:
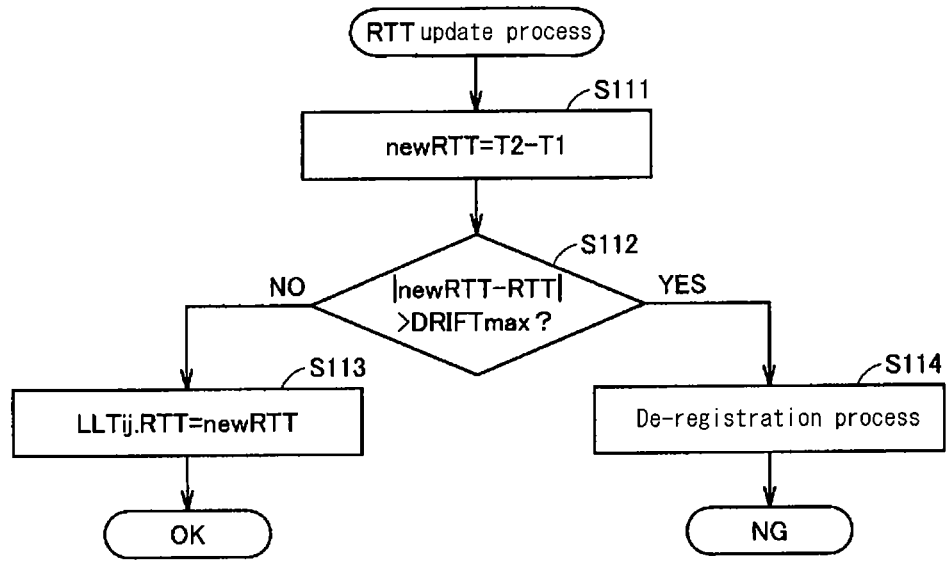
FIG. 15 is a flowchart for describing a procedure of an RTT update process.

FIG. 15 is a flowchart for describing the procedure of the RTT update process. First, the new RTT is updated to (T2−T1) (S111), and it is determined whether or not the difference between the new RTT and the original RTT is greater than a maximum drift value DRIFTmax (S112).

When the difference between the new RTT and the original RTT is less than or equal to the DRIFTmax (S112, No), the new RTT is set in the RTT in the LLTij (S113), and it is determined that the RTT update process has been successfully performed (OK). When the difference between the new RTT and the original RTT is greater than the DRIFTmax (S112, Yes), the de-registration process is performed (S114), and it is determined that the RTT process has failed (NG).

Figure 16:
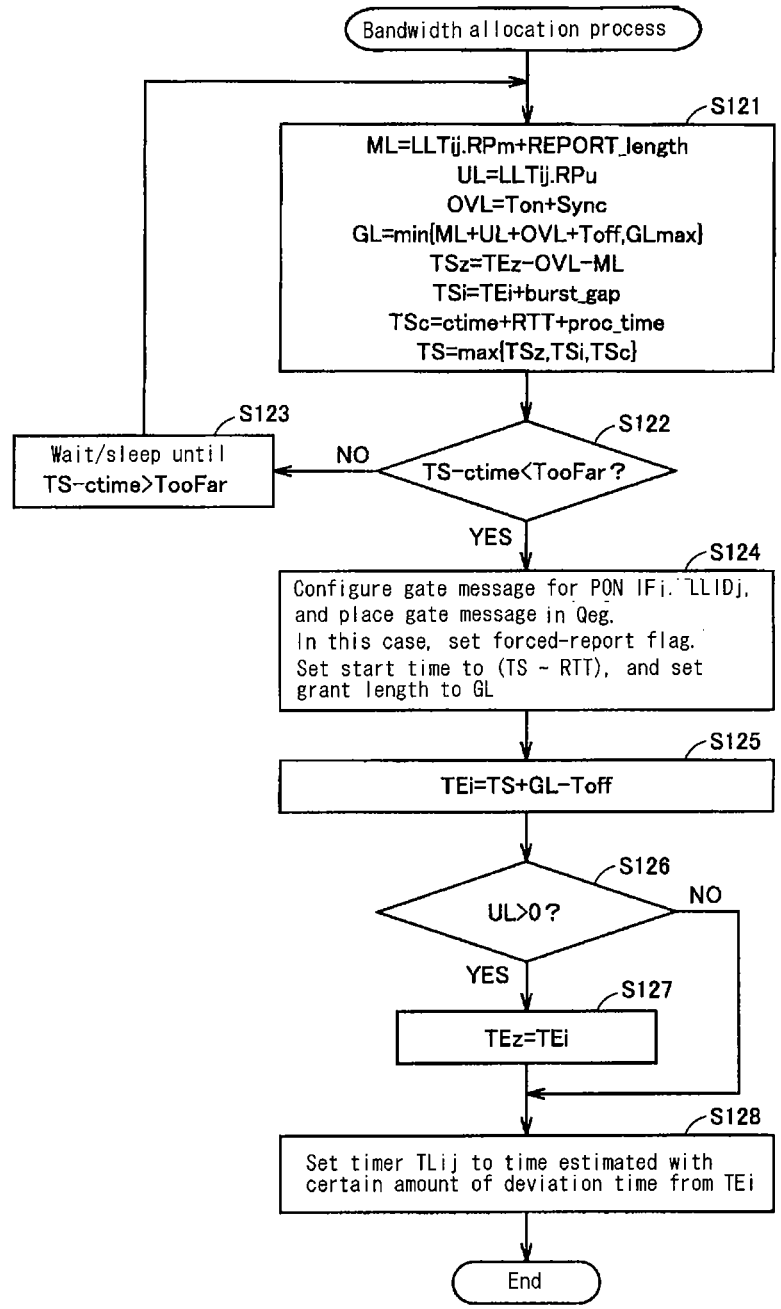
FIG. 16 is a flowchart for describing a procedure of a bandwidth allocation process.

FIG. 16 is a flowchart for describing the procedure of the bandwidth allocation process. It is assumed that bandwidth is to be allocated to the PON IF i, LLIDj. First, the sum of the time RPm required to send the management-use frame in the LLTij and the time REPORT_length required to send the report frame is represented by ML, that the time RPu required to send the user data frame in the LLTij is represented by UL, and that the overhead time (laser-on period Ton+synchronization period SyncTime) at the beginning of the burst is represented by OVL. Then, the smaller value of the sum of ML, UL, OVL, and Toff and the upper limit value GLmax of the grant length is represented by grant length GL.

The time obtained by subtracting OVL and ML from the overall final allocation time TEz is represented by TSz. The sum of the final allocation time TEi of the PON IF i and the burst gap time burst_gap is represented by TSi. Further, the sum of the current time ctime, the RTT, and the processing time proc_time of the home-side device is represented by TSc. Then, the latest time of TSz, TSi, and TSc is represented by TS (S121).

Next, the time obtained by subtracting the current time ctime from TS is compared with a system constant TooFar that is adapted to prevent the excessive precedence of the grant (S122). When the value given by TS−ctime is not smaller than the TooFar (S122, No), the process waits or sleeps until the value given by TS−ctime is smaller than the TooFar (S123). Then, the process returns to step S121, and the processing subsequent thereto is repeated.

When the value given by TS−ctime is smaller than the TooFar (S122, Yes), a gate message for the PON IF i, LLIDj is configured and is placed in the Qeg. In this case, a forced-report flag is set to make a forced-report instruction. Further, the start time is set to (TS−WIT), and the grant length is set to GL (S124). Then, the TEi is set to (TS+GL−Toff) (S125).

Next, it is determined whether or not the UL is greater than 0 (S126). When the UL is 0 (S126, No), the process proceeds to step S128 without updating the TEz. When the UL is greater than 0 (S126, Yes), the TEz is set to the TEi (S127).

Finally, the timer TLij is set to a time estimated with a certain amount of deviation time from the TEi (S128), and the process ends.

Note that simplicity may be preferential and that the ML may be included in the UL. Furthermore, the grant start time may be deliberately shifted from the best one.

At the end of the process, the report status of the corresponding logical link in the LLTij is invalidated. However, in a case where the report information is in queue form and a next entry exists, the report queue is updated with the report status kept valid.

Figure 17:
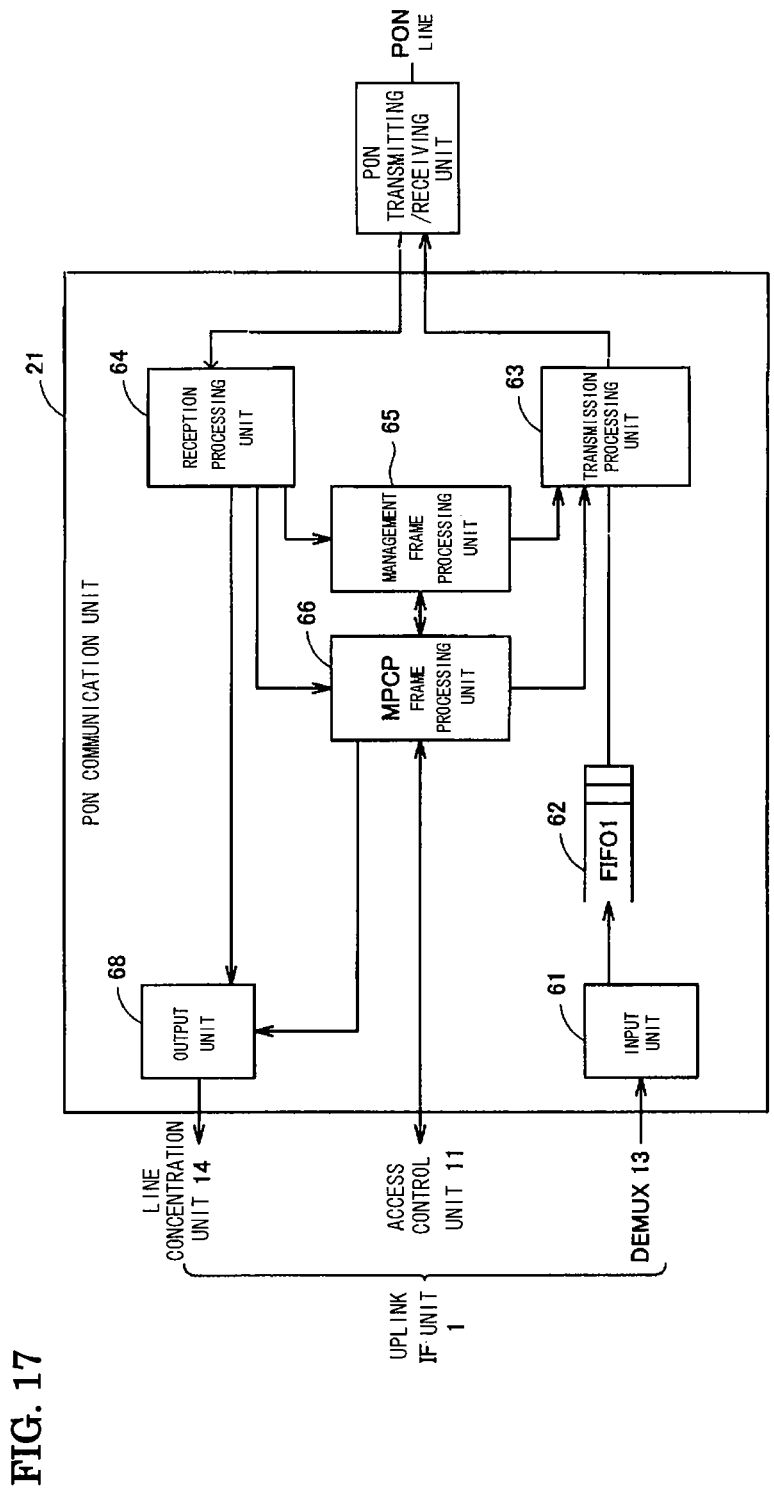
FIG. 17 is a block diagram illustrating an example configuration of a PON communication unit 21.

FIG. 17 is a block diagram illustrating an example configuration of the PON communication unit 21. The PON communication unit 21 includes an input unit 61 that receives a signal (internal format signal) from the DEMUX 13, a FIFO 1 (62) that accumulates signals input to the input unit 61, a transmission processing unit 63 that extracts the data accumulated in the FIFO 1 (62) and that converts the signal format and then outputs the resulting data to the PON transmitting/receiving unit 22, a reception processing unit 64 that determines the type of a frame input from the PON transmitting/receiving unit 22 and that selectively outputs the frame, a management frame processing unit 65 that receives a management frame from the reception processing unit 64 and that processes the management frame, an MPCP frame processing unit 66 that receives an MPCP frame from the reception processing unit 64 and that processes the MPCP frame, and an output unit 68 that receives a user data frame from the reception processing unit 64 and that converts the signal format and then outputs the user data frame to the line concentration unit 14. The PON communication unit 21 is generally implemented by one or a plurality of LSIs.

In a case where data has been accumulated in the FIFO 1 (62), the transmission processing unit 63 extracts the data, converts the signal format, and outputs the resulting data to the PON transmitting/receiving unit 22. However, when the management frame processing unit 65 or the MPCP frame processing unit 66 has a frame to be transmitted, the transmission processing unit 63 prioritizes the output of this frame. In this case, the highest priority is assigned to the MPCP frame. Further, the timestamp may be overwritten as required.

The management frame processing unit 65 processes a management frame for OAM, authentication, encryption setting, and the like. The present invention bears no relation to the content of the process itself which will not be described in detail. The management frame processing unit 65 configures a management frame that is required as a result of this process or voluntarily, and requests the transmission processing unit 63 to transmit it. In addition, as a result of the process, in a state where a certain logical link cannot be maintained, the management frame processing unit 65 instructs the MPCP frame processing unit 66 to de-register this logical link.

The MPCP frame processing unit 66 performs a process in accordance with the type of the MPCP frame input from the reception processing unit 64. When the MPCP frame is a registration request frame, the MPCP frame processing unit 66 performs authentication. When the authentication result is correct, the MPCP frame processing unit 66 transfers a registration request message to the access control unit 11. Note that the MPCP frame processing unit 66 may transfer the message to the access control unit 11 without performing authentication. Alternatively, first, the message may be transferred to and registered in the access control unit 11 and then, the management frame processing unit 65 may perform authentication using another protocol.

When the MPCP frame is a de-registration request frame or a registration confirmation frame, messages for them are transferred to the access control unit 11. In this case, a timestamp may be added.

When the MPCP frame is a report frame, the MPCP frame processing unit 66 checks the timestamp drift, and, when violation occurs, transfers a de-registration message to the access control unit 11. This check may be performed by the access control unit 11. When no violation occurs, the report message is transferred to the access control unit 11.

The MPCP frame processing unit 66 may add a timestamp when transferring the above messages to the access control unit 11.

The MPCP frame processing unit 66 monitors the intervals of report frames for each logical link, and determines connectivity. Then, when it is determined that the logical link has been disconnected or when a de-registration instruction is received from the management frame processing unit 65, the MPCP frame processing unit 66 transfers a de-registration message of the logical link to the access control unit 11. This process may be performed by the access control unit 11.

The PON communication unit 21 may also include a local access control unit (not illustrated). This local access control unit is designed to solely perform upstream access control of a PON line, and an access control method therefor follows a related art technique. The PON communication unit 21 and the MPCP frame processing unit 66 can perform switching as to whether MPCP messages are to be exchanged to the outside, for example, the access control unit 11 of the uplink IF unit 1, or to the local access control unit depending on the setting.

As described above, the office-side line concentration device according to the present embodiment is configured such that the access control unit 11 performs individual PON bandwidth allocations so that user data frames from PON lines can be consecutively transmitted in an uplink, thus enabling effective use of bandwidth in the uplink.

(Second Embodiment)

Figure 18:
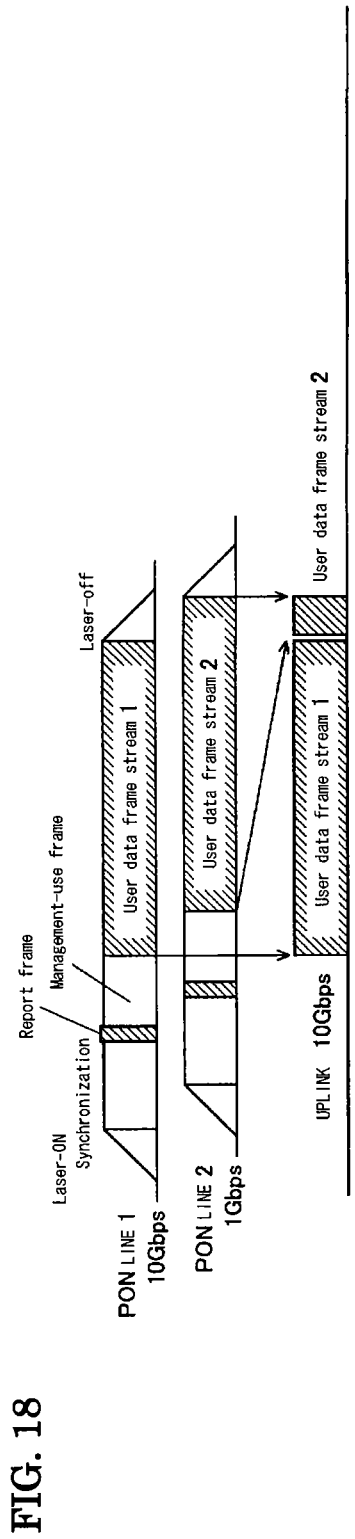
FIG. 18 is a diagram for describing an example of an access control method in an office-side line concentration device according to a second embodiment of the present invention.

FIG. 18 is a diagram for describing an example of an access control method in an office-side line concentration device according to a second embodiment of the present invention. In FIG. 18, a case where an upstream burst signal in a PON line 1 has a transfer rate of 10 Gbps and where an upstream burst signal in a PON line 2 has a transfer rate of 1 Gbps is illustrated. In the present embodiment, access control is performed so that a user data frame sending period of the PON line 1 and a user data frame sending period of the PON line 2 can be made to overlap, thus facilitating more effective use of bandwidth in an uplink.

Since the transfer rate of the PON line 2 is lower than that of the PON line 1, a user data frame stream in the PON line 2 is up-converted to that of the uplink speed so that the user data frames can be seamlessly arranged in the uplink.

Figure 19:
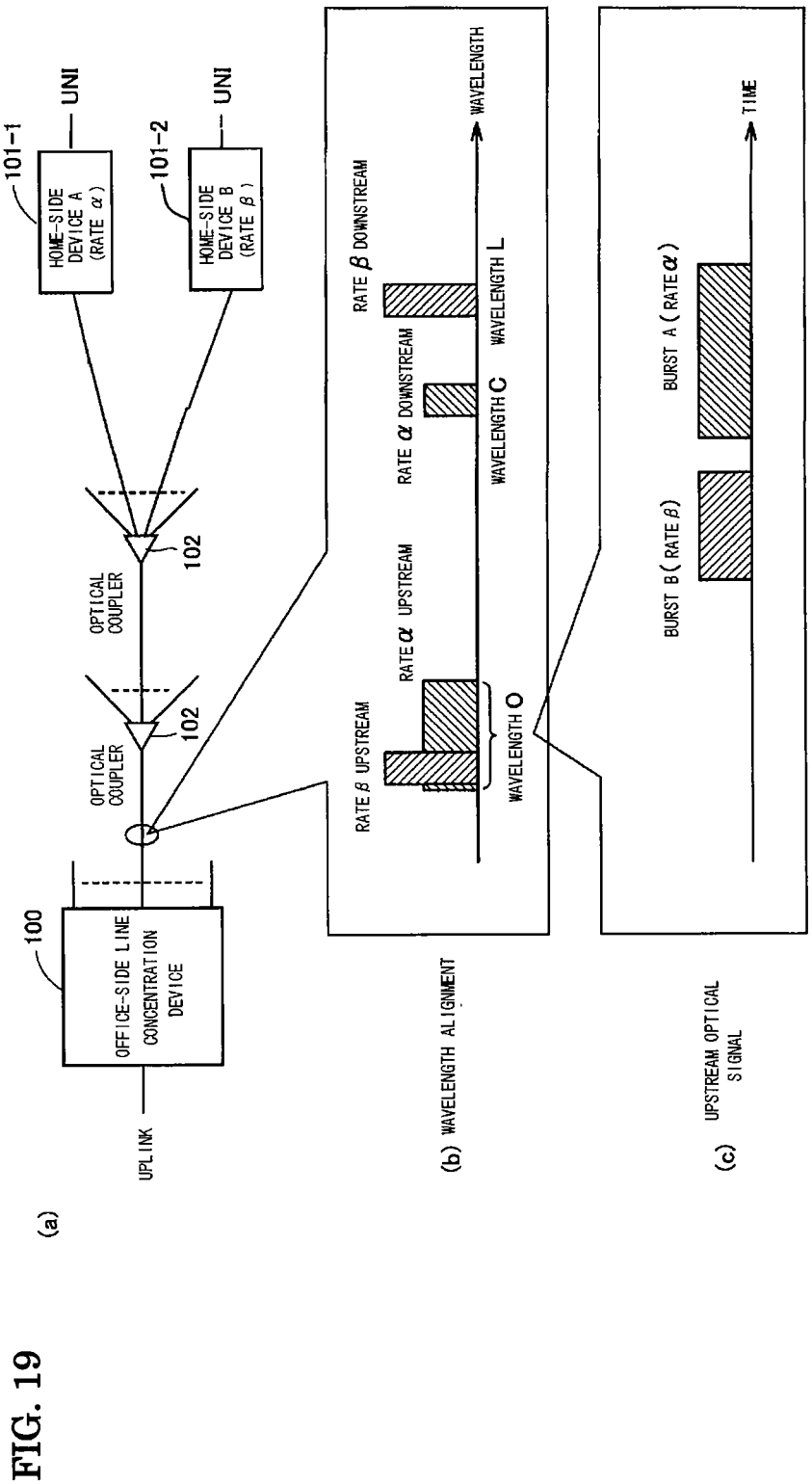
FIG. 19 is a diagram illustrating an example of connection of a line concentrator 100 according to an embodiment of the present invention.

FIG. 19 is a diagram illustrating an example of connection of an office-side line concentration device 100 according to an embodiment of the present invention. As illustrated in FIG. 19(*a*), this system includes the office-side line concentration device 100, a home-side device A 101-1 having a transfer rate $\alpha$, a home-side device B 101-2 having a transfer rate $\beta$, and a plurality of optical couplers 102. The transfer rate $\alpha$ is different from the transfer rate $\beta$.

As illustrated in FIG. 19(*b*), upstream optical signals (wavelength O), a downstream optical signal (wavelength C) having the transfer rate $\alpha$, and a downstream optical signal (wavelength L) having the transfer rate $\beta$ are wavelength-multiplexed, and independent signal transmissions on a single PON line are possible. On the other hand, the wavelength of the upstream optical signal having the transfer rate $\alpha$ and the wavelength of the upstream optical signal having the transfer rate $\beta$ overlap. Thus, as illustrated in FIG. 19(*c*), time-division multiplexing is performed so that the respective optical burst signals do not collide to provide independent signal transmissions on a single PON line.

For example, the home-side device A 101-1 is a GE-PON device, the home-side device B 101-2 is a 10 G-EPON device, the transfer rate $\alpha$ is 1 Gbps, and the transfer rate $\beta$ is 10 Gbps. These transfer rates are generic, and the actual transfer rates slightly change depending on the coding scheme or before or after the coding process. When the actual effective data rate is reduced due to the use of an error correcting code in a PON line, the effective data rate may be considered as the rate of the PON line.

Furthermore, in the present embodiment, it is assumed that the wavelength O is 1260 to 1360 nm, the wavelength C is 1480 to 1500 nm, the wavelength L is 1574 to 1580 nm, and $\alpha<\beta$.

Figure 20:
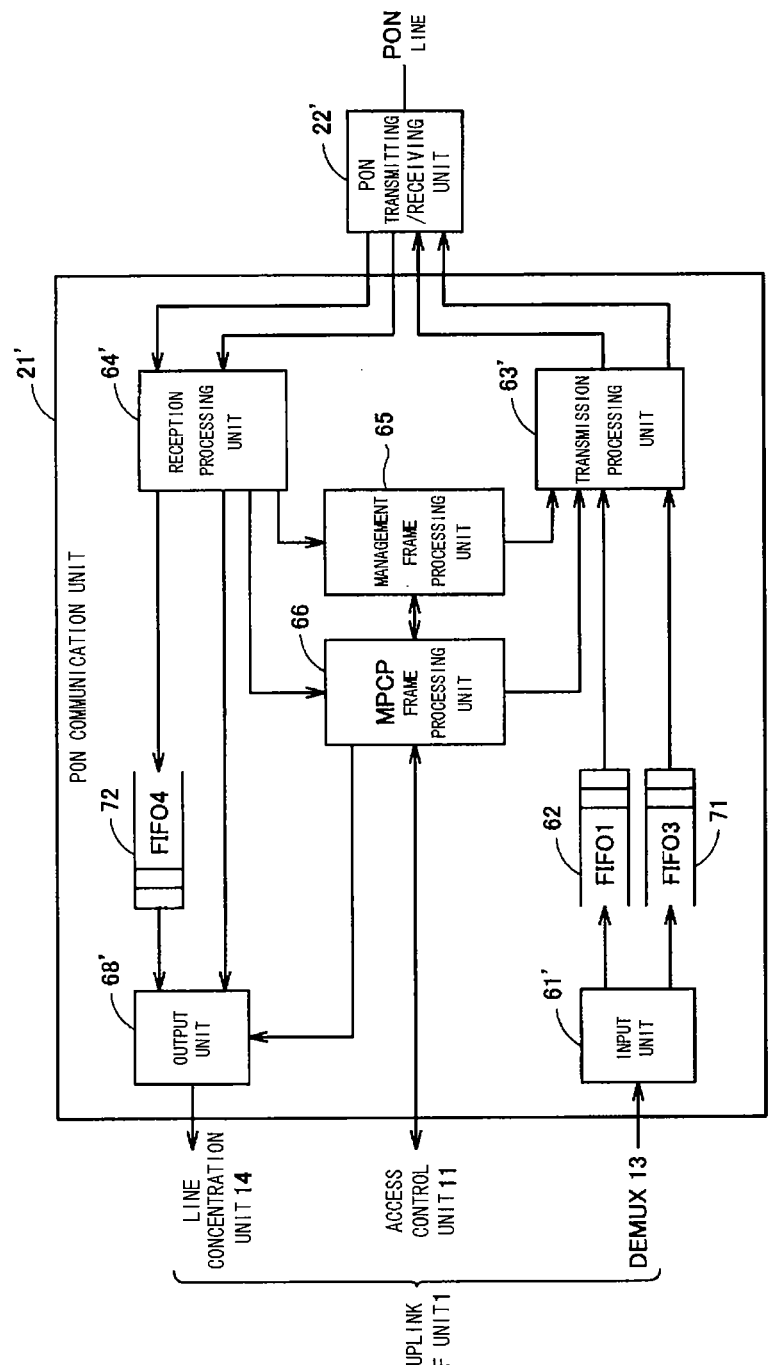
FIG. 20 is a block diagram illustrating an example configuration of a PON communication unit 21' according to the second embodiment of the present invention.
Figure 21:
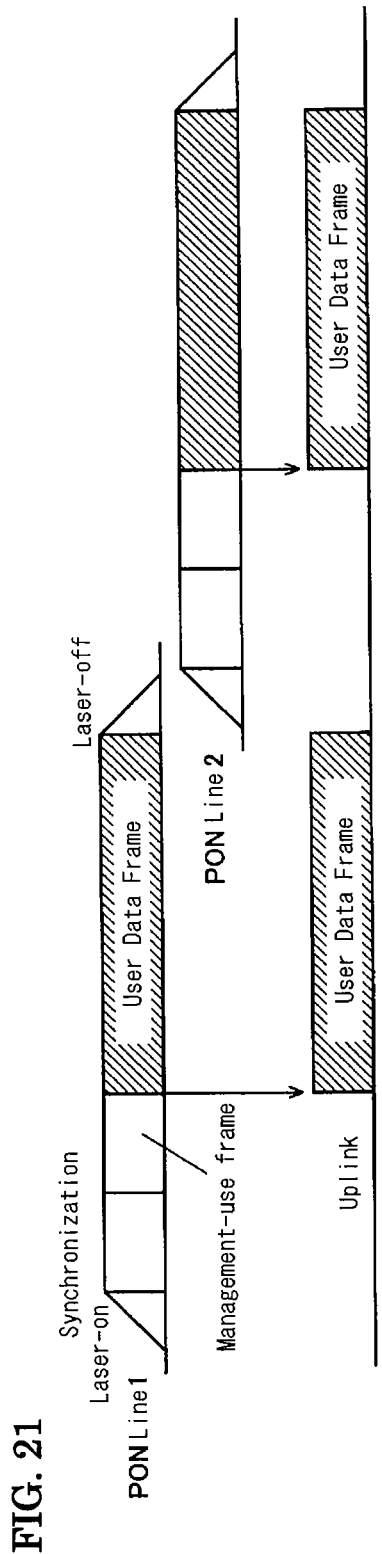
FIG. 21 is a diagram illustrating an example of an access control method in an office-side line concentration device disclosed in Patent Document 1.

FIG. 20 is a block diagram illustrating an example configuration of a PON communication unit 21' according to the second embodiment of the present invention. The difference from the PON communication unit 21 according to the first embodiment illustrated in FIG. 17 is only that a FIFO 3 (71) and a FIFO 4 (72) in which user data frames having different rates are accumulated are added and that the functionality of a PON transmitting/receiving unit, an input unit, a transmission processing unit, a reception processing unit, and an output unit differs. Therefore, the overlapping configurations and functions will not be described in detail redundantly.

A PON transmitting/receiving unit 22' is capable of simultaneously transmitting an optical signal having the wavelength C and the rate $\alpha$ and an optical signal having the wavelength L and the rate $\beta$. The PON transmitting/receiving unit 22' receives a signal having the rate $\alpha$ and a signal having the rate $\beta$ from a transmission processing unit 63', converts them into an optical signal having the wavelength C and the rate $\alpha$ and an optical signal having the wavelength L and the rate $\beta$, and outputs resulting signals to the PON line.

The PON transmitting/receiving unit 22' is also capable of receiving a dual-rate optical burst signal having the wavelength O. The PON transmitting/receiving unit 22' converts an optical signal received from the PON line into an electrical signal, and outputs the resulting signal to a reception processing unit 64'.

In FIG. 20, a synchronization process in accordance with the rates $\alpha$ and $\beta$ is performed inside the PON transmitting/receiving unit 22', and resulting signals are output to the reception processing unit 64' as different-rate electrical signals. The synchronization process of these signals may be performed by the reception processing unit 64'. The difference in rate may be automatically recognized from the received signals, or a rate of reception may be determined in advance on the basis of information indicating a grant of transmission of the above bursts.

Input and output signals from and to the DEMUX 13 and the line concentration unit 14 of the uplink IF unit 1 have a single rate corresponding to the rate of the uplink, which is, for example, 10 Gbps for 10 gigabit Ethernet (registered trademark). Here, it is assumed that the rate is equal to $\beta$.

Upon receipt of a signal from the DEMUX 13 of the uplink IF unit 1, an input unit 61' determines a logical link and the rate thereof, and outputs the signal to an FIFO corresponding to the rate. This output signal is converted into the internal signal format according to the rate.

In a case where data has been accumulated in the FIFO 1 (62) or the FIFO 3 (71), a transmission processing unit 63' individually extracts the data, converts the signal format, and thereafter transfers the result to the PON transmitting/receiving unit 22'. When the MPCP frame processing unit 66 or the management frame processing unit 65 has a frame to be transmitted, such a frame is prioritized. A rate is determined using the destination logical link of the frame, and the frame is inserted in a signal having the rate. When data flows in this signal, the frame is inserted in a frame interval.

The reception processing unit 64' determines the type of a frame having each rate from the PON transmitting/receiving unit 22', and, when it is a user data frame having the rate α, accumulates the frame in the FIFO 4 (72). The reception processing unit 64' may filter an undesired frame by receiving time or LLID.

In addition to receiving a user data frame from the reception processing unit 64', an output unit 68' extracts data from the FIFO 4 (72), converts the signal format, and then outputs the resulting data to the line concentration unit 14 of the uplink IF unit 1. The timing at which data is started to be extracted from the FIFO 4 (72) is specified by the MPCP frame processing unit 66.

The process of the access control unit 11, which is different from that in the first embodiment, will be described hereinafter. In the present embodiment, it is assumed that the grant length represents time. Specifically, when the same grant length is given to 1 G and 10 G logical links, the 10 G logical link is capable of transmitting information that is ten times that in the 1 G logical link.

A discovery gate is sent on a rate-by-rate basis. Therefore, the signal rates of registration requests received during the discovery period are reserved, and single rates are available. Further, the rate type is added to logical link information and, when a registration request is received, the corresponding rate is recorded in the rate type. This is based on the assumption that an uplink has a rate β and that a logical link having the same rate (β) and a logical link having a lower rate (represented by α) exist.

When the rate type of a logical link (represented by L) of a PON IF k to be allocated next is α, the calculation of TSz is performed using the following method: Since the grant length is the time unit, the grant length is calculated in a manner similar to that in the first embodiment. The time required when an amount of data transmitted at the rate a during the UL time is transmitted at the rate β is represented by ULB. The time obtained by adding ULB to TEz is represented by TEzn. TEzn is set as the laser-off start, and the time obtained by subtracting therefrom the grant length and the burst overhead time (Ton+SyncTime) is represented by TSz.

When grant information is sent to the PON IF unit 2, the rate type and the output start-enabled time TUS are added. It is assumed that TUS is obtained by subtracting ULB from the new overall final allocation time. TUS is reported to the output unit 68' of the PON communication unit 21', and the timing at which data is extracted from the FIFO 4 (72) is specified. The reason is to prevent FIFO underrun from occurring on the readout side because of low write speed to the FIFO 4 (72).

In FIG. 20, signals are split for every rate in the upstream direction of the PON communication unit. However, upstream signals in a PON line are multiplexed in the manner as illustrated in FIG. 19, and can therefore be integrated along a path extending through a single FIFO. In this case, the reception processing unit 64' increases or decreases the write speed to the FIFO in accordance with the rate of the received signal.

When α>β, the calculation of TSz and the update of the overall final allocation time are as follows: Since the grant length is the time unit, the grant length is calculated in a manner similar to that in the first embodiment. The times required when amounts of data transmitted at the rate a during the ML time and the UL time are transmitted at the rate β are represented by MLB and ULB, respectively. The time obtained by subtracting OVL and MLB from the overall final allocation time TEz is represented by TSz.

When a selected start time is represented by TS, the time obtained by adding OVL, MLB, and ULB to TS is represented by TE. The new overall final allocation time is set to TE when this allocation meets UL>0. When UL=0, the final allocation time is not updated.

As described above, the office-side line concentration device according to the present embodiment is configured to, even when a home-side device having a lower upstream rate than the rate of an uplink exists, perform access control so that an upstream burst signal from the home-side device can be early sent, accumulate a user data frame stream from the home-side device having a low transfer rate in a FIFO to adjust the timing of transmission to the uplink, up-convert the user data frame stream to that of the uplink speed, and send the resulting user data frame stream so that user data frames can be seamlessly arranged in the uplink. Therefore, more effective use of bandwidth in the uplink can be achieved.

The embodiments disclosed herein are examples only and are not to be considered as restrictive. The scope of the present invention is defined by the Claims rather than by the foregoing description, and all changes that come within the meaning and range of equivalents to the Claims are intended to be embraced therein.

Industrial Applicability

There are provided an office-side line concentration device, an access control device, and a computer program therefor capable of effective use of bandwidth in an uplink by the provision of a plurality of receiving means connected to each of a plurality of passive optical networks, and an interface means for controlling a transmission timing of user data from the plurality of passive optical networks so that user data received by the plurality of receiving means can be arranged closely in the uplink.

The invention claimed is:

1. An office-side line concentration device that accommodates a plurality of passive optical networks in which all transfer rates of user data are identical, the office-side line concentration device comprising:
    a plurality of receivers connected to each of the plurality of passive optical networks; and
    interface means for controlling transmission timing of burst signals from the plurality of passive optical networks so that user data included in a burst signal of a first passive optical network in the plurality of passive optical networks and user data included in a burst signal of a second passive optical network in the plurality of passive optical networks are arranged at an interval shorter than a total of a laser-on period, a synchronization period, and a report frame sending periods in an uplink in which an upstream transfer rate of user data is identical to all upstream transfer rates of the plurality of passive optical networks,
    wherein the interface means comprises means for selecting a time obtained by subtracting a predetermined time up to a time corresponding to the total time from a last allocated start time of a laser-off period in the burst signal of the first passive optical network as a start time for sending the burst signal of the second passive optical network.

2. An access control device that controls reception timing of burst signals from a plurality of passive optical networks in which all transfer rates of user data are identical, the access control device comprising:
    means for controlling transmission timing of the burst signals from the plurality of passive optical networks so that user data included in a burst signal of a first passive optical network in the plurality of passive optical networks and user data included in a burst signal of a second passive optical network in the plurality of passive optical networks are arranged at an interval shorter than a total of a laser-on period, a synchronization period, and a report frame sending periods in an uplink in which an upstream transfer rate of user data is identical to all upstream transfer rates of the plurality of passive optical networks; and means for instructing transmission of a grant including the transmission timing to home-side devices connected to the passive optical networks, wherein the means controlling transmission timing of the burst signals comprises means for selecting a time obtained by subtracting a predetermined time up to a time corresponding to the total time from a last allocated start time of a laser-off period in the burst signal of the first passive optical network as a start time for sending the burst signal of the second passive optical network.

3. A non-transitory computer-readable storage medium storing a computer program for causing a computer to execute control of reception timing of burst signals from a plurality of passive optical networks in which all transfer rates of user data are identical, the computer program causing the computer to execute:

a step of controlling transmission timing of the burst signals from the plurality of passive optical networks b selecting a time obtained by subtracting a redetermined time up to a time corresponding to a total time of a laser-on period, a synchronization period, and a report frame sending periods from a last allocated start time of a laser-off period in a burst signal of a first passive optical network in the plurality of passive optical networks as a start time for sending a burst signal of a second passive optical network in the plurality of passive optical networks, so that user data included in the burst signal of the first passive optical network and user data included in the burst signal of the second passive optical network are arranged in an uplink in which an upstream transfer rate of user data is identical to all upstream transfer rates of the plurality of passive optical networks; and a step of instructing transmission of a grant including the transmission timing to home-side devices connected to the passive optical networks.

* * * * *